United States Patent [19]

Battle et al.

[11] Patent Number: 4,532,957
[45] Date of Patent: Aug. 6, 1985

[54] GUIDES FOR GATE VALVES

[75] Inventors: Billy J. Battle, Birmingham; Lawrence S. Jones, Hueytown, both of Ala.

[73] Assignee: United States Pipe and Foundry Company, Birmingham, Ala.

[21] Appl. No.: 507,627

[22] Filed: Jun. 24, 1983

[51] Int. Cl.³ ............................................. F16K 27/00
[52] U.S. Cl. .................................. 137/375; 251/266; 251/329
[58] Field of Search ........ 137/375; 251/329, 266–268, 251/368

[56] References Cited

U.S. PATENT DOCUMENTS

| 1,110,731 | 9/1914 | Walp | 251/268 |
|---|---|---|---|
| 1,606,551 | 11/1926 | Williams | 251/266 |
| 3,032,310 | 5/1962 | Hansen | 251/329 |
| 3,100,500 | 8/1963 | Stillwagon | 137/375 |
| 3,662,778 | 5/1972 | Leopold, Jr. et al. | 137/375 |
| 3,763,880 | 10/1973 | Leopold, Jr. et al. | 251/268 |
| 3,870,233 | 3/1975 | Wilhelm et al. | 251/368 |
| 4,350,052 | 9/1982 | Kendall | 137/318 |

Primary Examiner—A. Michael Chambers
Assistant Examiner—Sheri Novack
Attorney, Agent, or Firm—James W. Grace; Charles W. Vanecek

[57] ABSTRACT

A friction reducing guide is provided as an insert in the metal gate of a resilient seated gate valve. The gate is encapsulated almost entirely with rubber except for the guide area. Friction is reduced and any corrosion resistant coating inside the valve body is protected, in the guide area, from excessive abrasion.

5 Claims, 3 Drawing Figures

GUIDES FOR GATE VALVES

BACKGROUND OF THE INVENTION

This invention is in the field of gate valves for water and waste water service. More particularly, the invention is in the field of resilient-seated gate valves, e.g., those covered by ANSI-AWWA specification C-509.

Resilient seated gate valves have metal gates either coated with rubber to form a resilient seat, i.e., seal, or they have a gate with a rubber seat either mechanically attached or bonded to the gate. The seat portion seals against the body of the valve after being closed by the well known means of a threaded stem and nut. The gate is guided as it descends into the valve body by grooves in the gate and mating protrusions on the body or the reverse thereof, i.e., grooves in the body and protrusions on the gate. Since such valves are almost exclusively used for water or waste water service, they are usually made of iron and the body portion is usually completely coated inside with a corrosion resistant coating. The preferred inside coating for these valve bodies is an epoxy suitable for contact with drinking water. While an inside epoxy coating is superior to almost all others, even the epoxy can be worn off the guide surfaces after relatively few operations of the valve in service. The guide surfaces with their corrosion resistant coatings thus removed are subject to corroding. This corroding might not be a serious hazard to the valve except that it occurs on guide surfaces which must slide on either rubber coated or uncoated iron surfaces. A buildup of corrosion on these surfaces can cause excessive torque requirements to operate the valve and, in extreme cases, cause failure of the operating mechanism. The importance of the invention herein disclosed is magnified when it is considered that valves in a water system may remain closed for long periods of time before operation is required. Corrosion of the guide surfaces and the thousands of pounds of force against one side of the gate makes a redoubtable task of manually opening such a valve. A valve equipped with the present invention will, however, open with ease since it will have its corrosion resistant coating system intact even though it has been operated in service many times.

SUMMARY OF THE INVENTION

Plastic inserts are placed inside grooves cast in the iron gate of a resilient seated gate valve. A guide groove is provided in each insert. The guide grooves mate with guide rails cast in the valve body. This could, of course, be reversed with the guide grooves in the body and the guide rails on the gate. The gate is raised and lowered by means of a threaded nut and stem. The nut is retained in a cavity cast in the top of the gate and the shape of the cavity and nut prevent rotation of the nut. With the novel plastic inserts torque to raise and lower the gate is appreciably decreased. Resilient seated iron gate valves are, for the most part, provided with an epoxy coating inside the body portion and the gate castings of most of these resilient seated valves ae either entirely coated with rubber or are entirely coated with rubber except for the guide area. The side grooves cast in the gate have protrusions which allow the plastic insert to be retained once it has been forced into place. Retention of the plastic insert is further assured once the rubber covering is bonded to the gate casting.

It is an object of the invention to provide a gate valve with an improved guide surface. It is another object of the invention to provide a gate valve with an improved guide surface for easier operation and longer life.

Other objects and features of the present invention will occur to those skilled in the art when the following description is considered in conjunction with the accompanying drawings in which like numerals indicate like elements and in which:

DESCRIPTION OF THE PREFERRED EMBODIMENT

Figure 1:
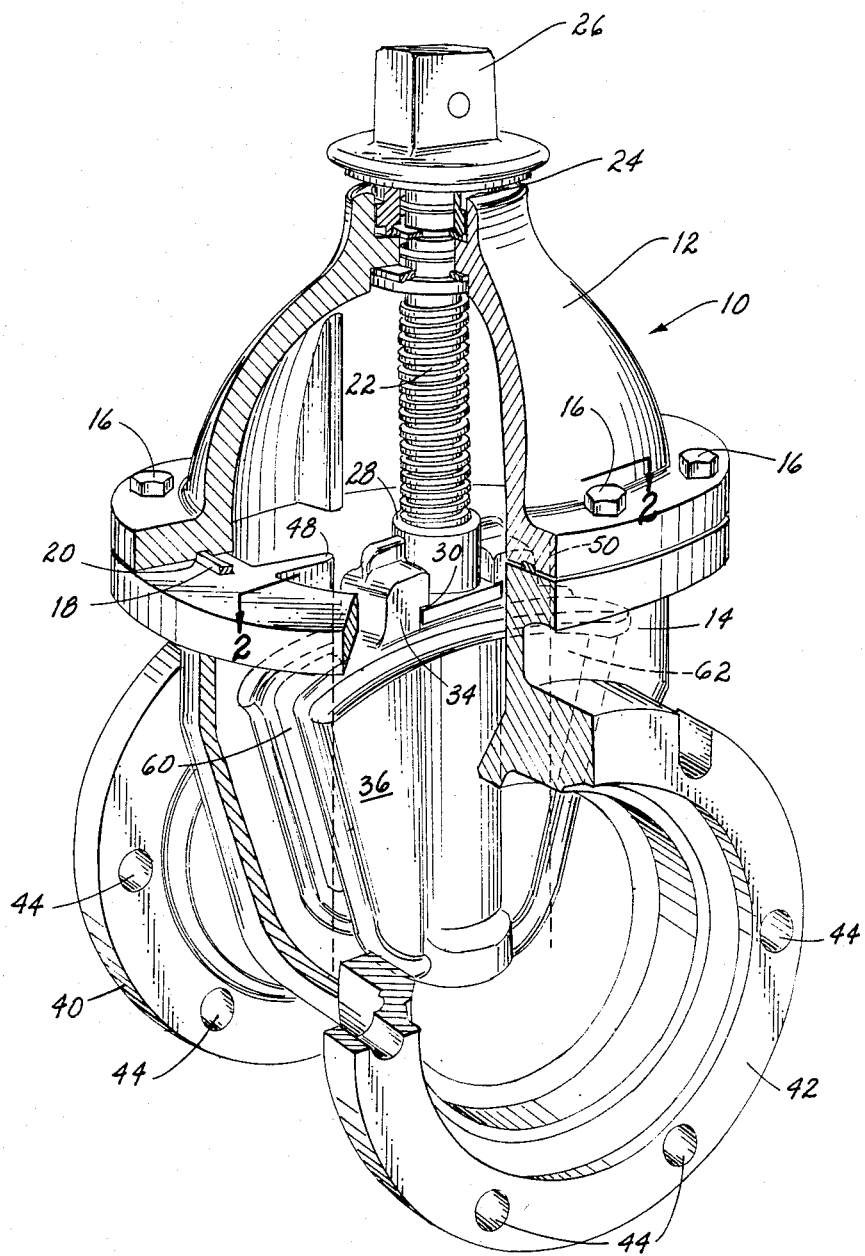
FIG. 1 is a perspective view (partially cut away) of the gate valve of the invention.

Referring to FIG. 1 there is shown a perspective view of a gate valve 10 which comprises a bonnet 12 bolted to a body 14 by means of bolts 16. A rubber or neoprene gasket 18 is held in a recess 20 in bonnet 12 and is compressed when bolts 16 are tightened.

Bonnet 12 provides a housing to enclose a threaded valve stem 22 which extends through an upper opening 24 in bonnet 12 and is capped by an operating nut 26. Suitable seal-plates and o-rings, well known in the prior art are used in conjunction with the upper end of threaded valve stem 22 to prevent leakage of water around opening 24.

The lower end of valve stem 22 threadedly rotates within stem nut 28 which is attached to and engages a cavity 30 cast in the top yoke 34 of gate 36. A hollow cylindrically-shaped opening extends downwardly from yoke 34 to the bottom of gate 36 to receive valve stem 22 as the gate 36 is raised to its open position.

As valve stem 22 is rotated in one direction, stem nut 28 rides upwardly over the threaded shaft of valve stem 22. When valve stem 22 is rotated in the opposite direction, stem nut 28 rides downwardly over the threaded shaft of valve stem 22.

Body 14 has an entrance flange 40 and an exit flange 42 each of which have bolt holes 44 to retain flanged pipes (not shown). The central interior portion of body 14 is formed to receive gate 36. Along the vertical centerline of body 14 is a pair of guide rails 48 and 50 which extend inwardly toward the center of the body 14. Guide rails 48 and 50 form tracks which engage guide grooves in gate 36.

Figure 3:
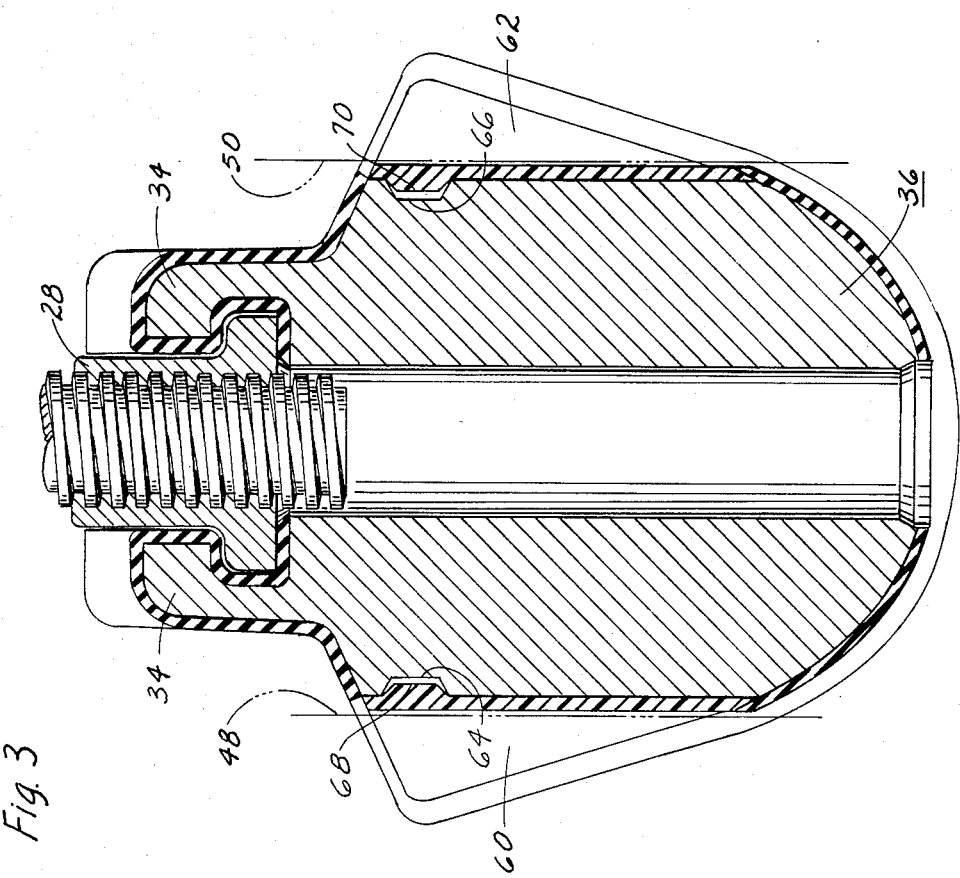
FIG. 3 is a cross-sectional view of the gate valve taken along line 3—3 of FIG. 2.
Figure 2:
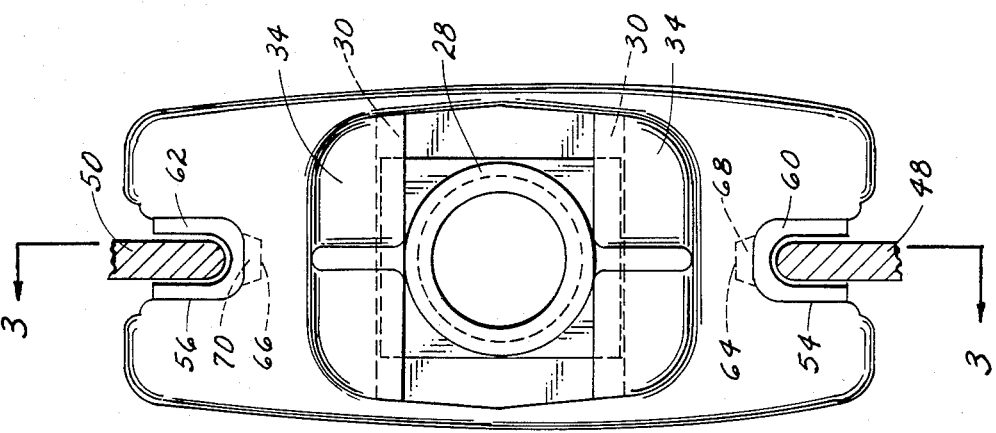
FIG. 2 is a top view of the gate and guide rails of the present invention taken along line 2—2 of FIG. 1.

Gate 36 is shown in greater detail in FIGS. 2 and 3. FIG. 2 which is a top view of gate 36 shows stem nut 28 engaged in cavity 30 cast in the top yoke 34 of gate 36.

Cast into one side wall of gate 36 is a guide groove 54 which extends downwardly to form a track in which guide rail 48 of body 14 will lie. The other side wall of gate 36 is symmetrical and has cast-in a guide groove 56 which forms a track for guide rail 50.

Within guide grooves 54 and 56 are placed inserts 60 and 62. As shown in FIG. 3 depressions 64 and 66 cast into the upper rear portions of grooves 54 and 56 form seats for projections 68 and 70 at the rear of inserts 60 and 62 respectfully to anchor the inserts in the rear walls of grooves 54 and 56. The plastic inserts 60 and 62 are further held in place by guide grooves 54 and 56 being horseshoe shaped in cross section forming a dovetailed locking system.

A coating of epoxy covers the interior surfaces of bonnet 12 and body 14 protect these exposed surfaces from the effects of the fluids flowing through and within the gate valve 10.

A rubber protective coating covers all of gate 36 except for the grooves 54 and 56 which receive inserts 60 and 62. Inserts 60 and 62 are held in grooves 54 and 56 by means of the rubber coating which covers the remainder of gates 36 and cover the outer edge of inserts 60 and 62. If desired inserts 60 and 62 may be bonded to the grooves 54 and 56 by epoxy or other suitable adhesives.

Inserts 60 and 62 are made of a suitable plastic material of high compressive strength which does not expand when exposed to water. It should be understood that the plastic material can be used as the inserts or on the guide rails whether on the gate or on the valve body. An acetyl copolymer of acetyl homopolymer may be used as the plastic material of inserts 60 and 62. The preferred plastic material is acetyl homopolymer such as that sold by the E. I. DuPont Company of Wilmington, Del. under the tradename Delrin which has been found to be suitable. These acetyl homopolymers are made by the polymerization of formaldehyde and have unusual properties of high strength, rigidity, excellent dimensional stability and resilience. They maintain these properties over a wide range of useful service temperatures and humidities.

Acetyl homopolymers may have a tensile strength of up to 10,000 p.s.i. and a flexural modulus of 410,000 p.s.i. Creep resistance and fatigue endurance are outstanding. The low moisture absorption gives excellent stability. The abrasion resistance of the polymer is generally superior to other thermoplastics. It has a slippery feel and has a very low coefficient of friction.

Acetyl copolymers could be used for the inserts if the compresive stress was limited to that which could be withstood by the copolymer material. This of course would require a larger guide area or lower pressure allowed in the system employing the valve.

Other compounds such as rubber have been tried but found to lack sufficient compressive strength. Rubber tends to wear or tear away under stress conditions and leaves a metal to metal condition which cut the rubber coating.

Polyethylene and polyurethane materials have been tried but were found to be inferior to Delrin because of lower compressive strength and resulting cold flow under stress.

As an alternative construction, the guide rails 48 and 50 may be covered with the acetyl homopolyner material and the grooves in the gate are epoxy coated.

As a further alternative construction, the guide rails may be cast in the sides of the gate and the guide grooves may be cast in the body of the gate valve in place of the guide rails. In this version the plastic inserts are fitted into the guide grooves in the body.

The preferred embodiment is to be considered in all respects as illustrative and not restrictive, the scope of the invention being indicated by the appended claims.

We claim:

1. In a resilient seated gate valve comprising a valve body coated over its entire interior surface with a corrosion resistant coating, a gate, means for raising and lowering said gate, means for guiding said gate during raising and lowering, said means for guiding said gate comprising a groove in each side of said gate and a mating rail on the inside of said valve body, the improvement comprising a coating of a rubber material covering all of the outside surfaces of said gate except for each of said grooves in each side of said gate and a thermoplastic or thermosetting plastic insert held inside each of said grooves in said gate and forming a groove for engaging said mating rail inside said valve body whereby said corrosion resistant coating on said mating rail is protected from abrasion.

2. A resilient seated gate valve as recited in claim 1 in which said inserts are mechanically held against vertical and horizontal movement.

3. A resilient seated gate valve as recited in claim 2 wherein said plastic inserts are held in said grooves in said gate by a rubber coating on said gate.

4. A resilient seated gate valve as recited in claim 2 wherein said inserts are bonded to said gate.

5. A resilient seated gate valve as recited in claim 1 wherein the guide rails are covered with an antifriction thermoplastic and the slots are epoxy coated.

* * * * *